(12) United States Patent
Hirono et al.

(10) Patent No.: US 9,038,917 B2
(45) Date of Patent: May 26, 2015

(54) SYSTEM AND METHOD FOR NOISE REDUCTION IN A BAR CODE SIGNAL

(75) Inventors: Mitsuaki Hirono, Saitama (JP); Naoya Niizeki, Saitama (JP); Depei Ji, Saitama (JP)

(73) Assignees: Optoelectronics Co. Ltd. (JP); Opticon, Inc., Renton, WA (US)

(*) Notice: Subject to any disclaimer, the term of this patent is extended or adjusted under 35 U.S.C. 154(b) by 0 days.

(21) Appl. No.: 13/363,894

(22) Filed: Feb. 1, 2012

(65) Prior Publication Data
US 2013/0193213 A1 Aug. 1, 2013

(51) Int. Cl.
*G06K 7/10* (2006.01)

(52) U.S. Cl.
CPC .................. *G06K 7/10851* (2013.01)

(58) Field of Classification Search
CPC .................................. G06K 7/10851
USPC .............. 235/462.01, 462.25, 462.26, 462.29
See application file for complete search history.

(56) References Cited

U.S. PATENT DOCUMENTS

| | | | |
|---|---|---|---|
| 4,101,784 A | | 7/1978 | Key et al. |
| 5,028,771 A | | 7/1991 | Yang |
| 5,449,893 A | * | 9/1995 | Bridgelall et al. ....... 235/462.27 |
| 5,475,206 A | * | 12/1995 | Reddersen et al. ...... 235/462.39 |
| 5,533,046 A | * | 7/1996 | Lund .............................. 375/130 |
| 5,550,362 A | | 8/1996 | Sherman |
| 6,811,087 B2 | | 11/2004 | Nakamura et al. |
| 7,354,000 B2 | | 4/2008 | Nakano et al. |
| 7,526,130 B2 | | 4/2009 | Hayakawa et al. |
| 2004/0004127 A1 | * | 1/2004 | Nakamura et al. ....... 235/462.26 |
| 2006/0016893 A1 | | 1/2006 | Barkan et al. |
| 2007/0273794 A1 | | 11/2007 | Sprague et al. |
| 2009/0084853 A1 | | 4/2009 | Giebel et al. |

OTHER PUBLICATIONS

Officer: Jacqueline Pitard, "Related International Patent Application No. PCT/US2012/024057 International Search Report and Written Opinion", Oct. 2, 2013, Publisher: PCT, Published in: EP.
"Parent International Patent Application No. PCT/US2012/031978", "International Search Report and Written Opinion", Jun. 25, 2012, Publisher: PCT/ISA, Published in: US.
"Related International Application No. PCT/US2012/031978", "International Preliminary Report on Patentability", Oct. 16, 2014, Publisher: IB of WIPO, Published in: CH.
"Related International Patent Application No. PCT/US2013/024057", "International Preliminary Report on Patentability", Aug. 14, 2014, Publisher: PCT/ISA, Published in: EP.

* cited by examiner

*Primary Examiner* — Christopher Stanford
(74) *Attorney, Agent, or Firm* — Kaplan Breyer Schwarz & Ottesen, LLP

(57) ABSTRACT

A system and method for reading a bar code are disclosed which may include transmitting light pulsed at a selected frequency to illuminate the bar code; converting light received at the bar code reader from the bar code into an electrical signal; transmitting the electrical signal through a signal conditioning circuit to filter and amplify the electrical signal, to thereby provide a conditioned electrical signal; sampling the conditioned electrical signal at the selected frequency; removing energy due to light scattering within a housing of the bar code reader from the sampled, conditioned electrical signal; generating one of a logical "1" and a logical "0" output based on a value of the signal generated by the step of removing; and resolving output from the step of generating into data indicative of information on the bar code.

23 Claims, 5 Drawing Sheets

SYSTEM AND METHOD FOR NOISE REDUCTION IN A BAR CODE SIGNAL

RELATED APPLICATIONS

U.S. Pat. Nos. 7,354,000 and 7,526,130 are commonly assigned, and are hereby incorporated by reference herein.

BACKGROUND OF THE INVENTION

A transition from fluorescent and other forms of traditional lighting to Light Emission Diode (LED) illumination is occurring in various environments including retail outlets, office buildings, warehouses, hospitals, and private homes. LED illumination may provide the benefits of low power consumption, low running cost, long life, and high color rendering effect among other desirable features. Some nations are now moving to ban further manufacture of conventional light bulbs for environmental reasons.

Bar code readers are commonly used in retail environments, including convenience stores, supermarkets and the like. Generally, a laser-scanned barcode reader operates by sweeping a laser beam, commonly having a 650 nm wavelength, over a bar code and receiving light energy reflected from the bar code, which is processed to generate a bar code signal. In a typical application, a laser beam using a 100 Hz scan rate will produce a signal having a frequency range of 30 kHz (kilohertz) to 200 kHz, depending on the resolution of the bar code and the read distance (the distance from the bar code to the bar-code reader).

To suppress power consumption, LED bulbs are generally driven at a frequency within a range of about 30 kHz to 100 kHz which overlaps with the frequencies of many bar code signals. It would be hard for a bar code reader to distinguish light energy from ambient light from light energy from a bar code signal if the frequency ranges of the two signal types overlap. To eliminate interference of the ambient light with bar code readers, U.S. Pat. No. 6,811,087, which is incorporated by reference herein, discloses a technique to scan a bar code using a pulsed laser at a frequency of 2 MHz (megahertz) and using a synchronous detector to detect this frequency and preferably no other frequencies. This technique significantly removes ambient light having a constant intensity (such as sunlight) and light energy from high frequency L.E.D. illumination. However, where there are ambient light frequency components in common with a bar code signal, the decoder within the bar code reader could misread ambient light as being part of a bar code signal, which could lead to a signal reading failure.

Moreover, other possible sources of noise may be present in bar code reading environments as discussed in the following. Laser-scanned bar code readers commonly have exit windows made of glass or plastic (i.e., polycarbonate, Polymethyl methacrylate material) to protect the sensitive parts inside the reader housing. Although coated with an anti-reflective film, dirt or a finger-print on the exit window would present an optical obstruction resulting in significant back-scatter light being directed toward the photo sensor. The back-scattering of light would be more severe in a retro-reflective type barcode reader, in which the outgoing laser beam and the collected light beam received by the reader share the same optical path. Whereas the signal intensity from a bar code at a distance of 300 to 500 mm has a magnitude of about 0.1 uW (microwatts), the back scatter light could reach a magnitude of 1 uW, which is ten times the magnitude of the bar code signal. The above-described situation may thus lead to an inability of the bar code reader to accurately read a bar code.

Thus, an approach is needed to enable the bar code reader to focus the reading equipment on light energy reflected from the bar code and to screen out light energy from ambient light. One tool for accomplishing this screening process is to employ a synchronous detector that samples at the same rate as the pulse rate of the outgoing laser light.

In existing systems, bar code signals are generally assigned a binary "1" or "0" value right after synchronous detection occurs. Apparatus using synchronous detection is generally less affected by ambient light than other systems, but tend to have difficulty removing low-frequency components of internally scattered light, such as light reflected from a exit window and/or housing, from signal energy from which it is desired to extract a digital bar code signal.

When a signal that includes a substantial low-frequency component is amplified, the signal may acquire a magnitude that exceeds the operating range of the device processing the signal. As a result, the bar code signal components will be collapsed in the ultimate output signal. Even if the output of the synchronous detection is already at the maximum amplitude, the target bar code signal cannot be amplified sufficiently if the low-frequency noise component is large. Consequently, the resulting signal outputs cannot be effectively resolved into logical "1" and logical "0" values, which situation may make it impossible to properly read a bar code.

Accordingly, there is a need in the art for improved systems and methods for removing noise components in bar code reading equipment.

SUMMARY OF THE INVENTION

According to one aspect, the present invention is directed to a system and method for reading a bar code, which may include transmitting light pulsed at a selected frequency to illuminate the bar code; converting light received at the bar code reader from the bar code into an electrical signal; transmitting the electrical signal through a signal conditioning circuit to filter and amplify the electrical signal, to thereby provide a conditioned electrical signal; sampling the conditioned electrical signal at the selected frequency; removing energy due to light scattering within a housing of the bar code reader from the sampled, conditioned electrical signal; generating one of a logical "1" and a logical "0" output based on a value of the signal generated by the step of removing; and resolving output from the step of generating into data indicative of information on the bar code.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

In one embodiment herein, we output a synchronously detected signal through a high-pass filter or differential circuit, to remove the low frequency components from the signal. In another embodiment, we apply Automatic Gain Control (AGC) to a signal that emerges from the high-pass filter, so that the signal can be amplified enough to be converted into one of two binary values. In this way, we assign binary values to the signal after the signal has been adequately amplified. The above-described sequence of signal processing may enable bar codes to be read successfully even if the internal scattered light reflected from the exit window and/or housing is of significant magnitude.

In the following, we present a broad description of the treatment of light energy received in the detection circuit of bar code reader 10, followed by more detailed descriptions of specific embodiments of the present invention.

Figure 1:
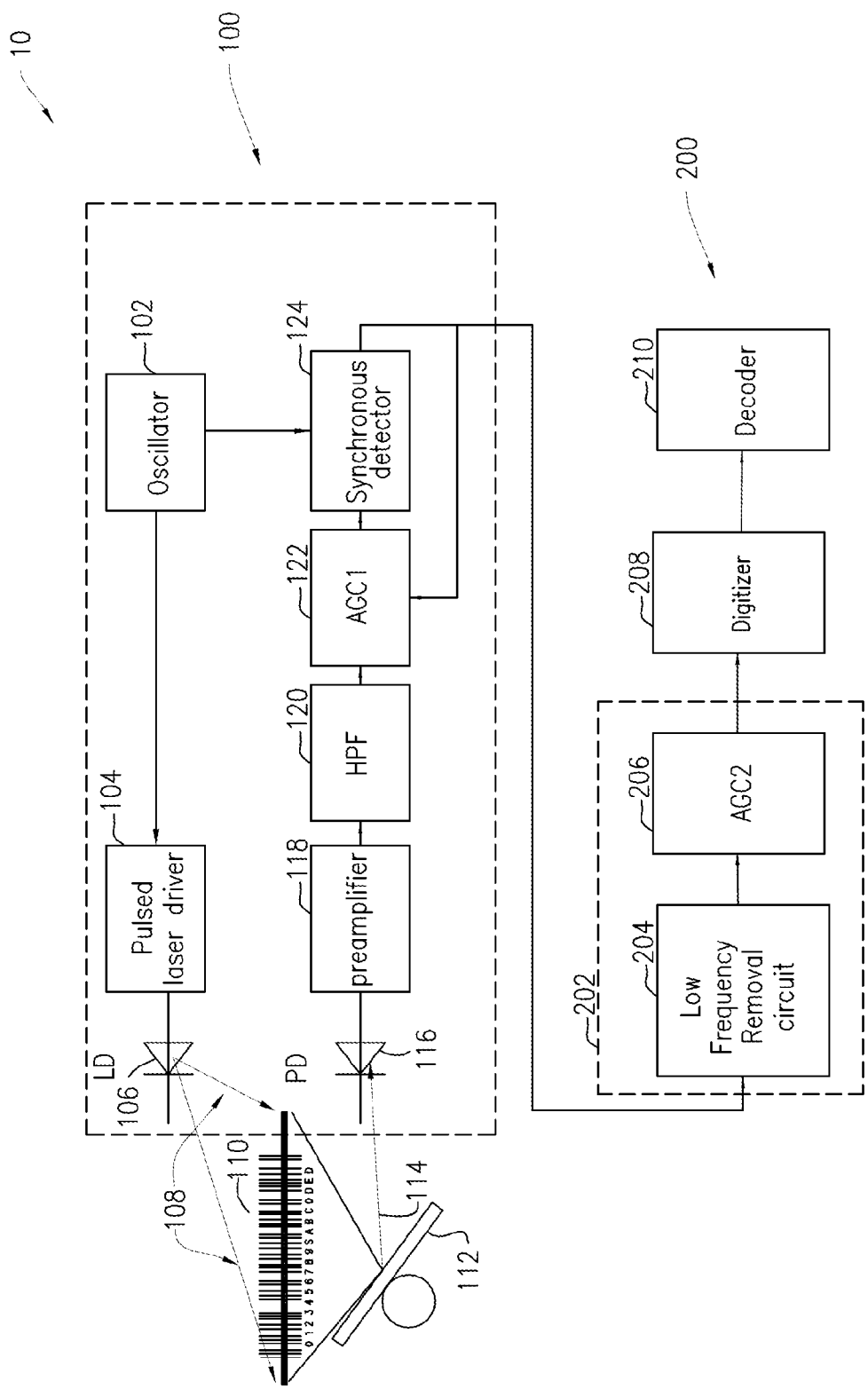
FIG. 1 is block diagram of a bar code reader incorporating frequency filtering and gain control in accordance with an embodiment of the present invention.

FIG. 1 is block diagram of a bar code reader 10 incorporating frequency filtering and gain control in accordance with an embodiment of the present invention. Bar code reader 10 may include primary bar code circuit 100 and further signal processing circuit 200. Primary bar code circuit 100 may include oscillator 102, pulsed laser driver 104, laser diode (LD) 106, scan mirror 112, photodiode (PD) 116, preamplifier 118, high-pass filter (HPF) 120, first automatic gain control circuit (AGC1) 122 and/or synchronous detector 124. HPF 120 preferably has a cutoff frequency of about 500 KHz. Synchronous detector 124 may include a band-pass filter having a pass-through frequency band substantially centered on a frequency that is same as, or substantially the same as, the frequency as the signal emerging from pulsed laser driver 104. This band-pass filter (not shown) is preferably operable to cause synchronous detector 124 to sample the signal from AGC1 122 at the same frequency, or substantially the same frequency, as the signal emerging from pulsed laser driver 104. Synchronous detector 124 may further include a waveform detector. Synchronous detector 124 may further include a product detector operable to cause the detector 124 to sample the signal from AGC1 122 at the frequency, or substantially the same frequency, as the signal emerging from pulsed laser driver 104.

Further signal processing circuit 200 may include filter/gain circuit 202 which may in turn include low frequency removal circuit 204 and/or AGC2 (automatic gain control circuit 2) 206. Further signal processing circuit 200 may further include digitizer 208 and/or decoder 210. The low frequency removal circuit 204 may have a cutoff frequency of about, or slightly less than, 10 KHz.

FIG. 1 also shows outgoing pulsed laser signal 108, bar code 110, and reflected signal 114. Depending on the operating circumstances of bar code reader 10, light signal 114 received at photodiode 116 may include light from one or more sources. These sources may include (a) light energy reflected from bar code 110, (b) light energy reflected off an internal surface of a lens of bar code reader 10 (that is, a surface of a lens located within a housing of bar code reader 10), and/or (c) ambient light energy entering bar code reader 10 from an exterior of bar code reader 10.

In the embodiment shown in FIG. 1, low-frequency removal circuit 204, which may be a high-pass filter, is preferably operable to suppress low-frequency noise energy present in received light signal 114. The removal of low-frequency noise preferably enables additional gain to be imparted to received light signal 114 without incurring an overflow (excessive voltage) condition.

Figure 2:
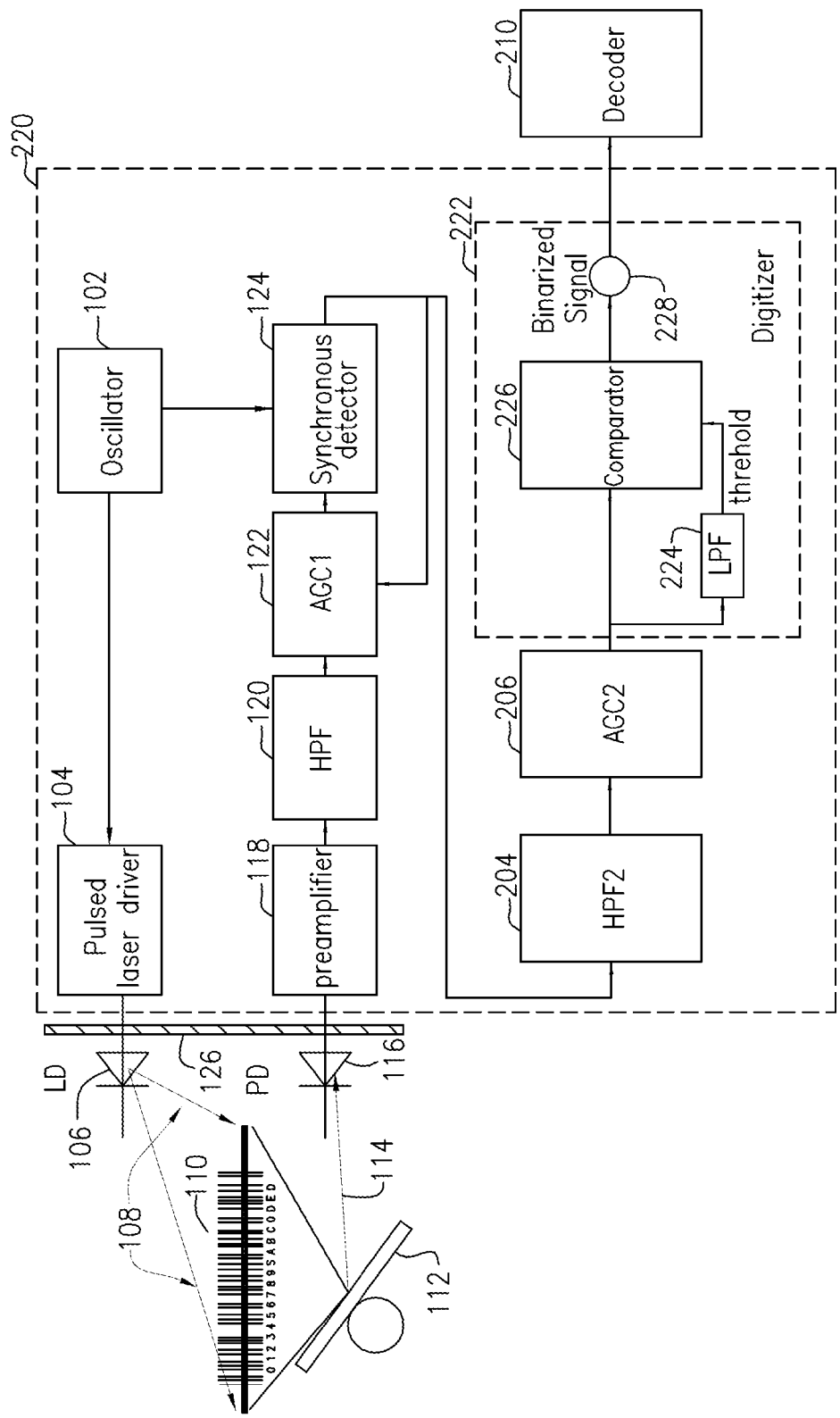
FIG. 2 is block diagram of a bar code reader incorporating frequency filtering and gain control in accordance with another embodiment of the present invention.

FIG. 2 is a block diagram of a bar code reader 10 incorporating frequency filtering and gain control in accordance with an embodiment of the present invention. For the sake of brevity, the following discussion of FIG. 2 does not repeat the recitation of all parts listed above, in the discussion of the embodiment of FIG. 1. Instead, the following discusses the portions of the embodiment of FIG. 2 that differ from the embodiment of FIG. 1. In the embodiment of FIG. 2, digitizer 208 of the embodiment of FIG. 1 may be replaced by digitizer circuit 222 of FIG. 2. Digitizer circuit 222 may include low-pass filter 224 and/or comparator 226, which together may provide binary signal 228 as an output. The low pass filter 224 may have a cutoff frequency of about 60 KHz.

In the embodiment of FIG. 2, a second HPF circuit 204 preferably receives the signal output from synchronous detector 124 and preferably removes low-frequency light energy from the received signal. Since the low-frequency light energy is generated by light scattered toward an interior of bar code reader 10 from exit window 126 (FIG. 2) or scatter rays generate by surfaces other than window 126, the removal of the low-frequency light energy may significantly reduce the overall magnitude of the light signal that initially enters HPF2 204.

In view of the limited gain capacity of AGC2 circuit 206, a much wider dynamic gain range for a real bar code signal is desirable. We consider a case in which laser diode 106 is pulse driven at 2 MHz. The first HPF 120 may have a cut-off frequency set to about 2 MHz (megahertz). However, the second HPF, HPF2 204, may have a cut-off frequency that matches the fluctuation of the offset, which would generally be much lower than 2 MHz. Otherwise stated, HPF2 204 is preferably directed to removing light energy from scattering, rather than removing the pulse-signal component of the light signal energy passing therethrough. Accordingly, the frequency cutoff of HPF2 204 may be set substantially at the frequency of the bulk of the scattered light energy, which scattered light energy is expected to be substantially lower than the 2 megahertz pulse signal frequency.

In this embodiment, the output from AGC2 206 is preferably split into two paths, with a first such signal path being sent directly to comparator 226 (the uppermost of the two signal lines shown in FIG. 2), and a second signal path directed to LPF 224 to be filtered therein. The signal sent to LPF 224 is low-pass filtered in LPF 224 to generate a DC (direct current) component of the output from AGC2 206 which may then serve as the threshold voltage for use within comparator 226. Within comparator 226, if the signal from AGC2 206 signal voltage is higher than the threshold voltage from LPF 224, the output of comparator 226 may be set to a voltage corresponding to a logical value of "1". Otherwise, the output from comparator 226 is preferably set to a voltage corresponding to a logical value of "0".

Still with reference to FIG. 2, we note that the devices encompassed by the dashed line called out by reference numeral 220 may be implemented on one or more analog ASIC circuits.

Figure 3:
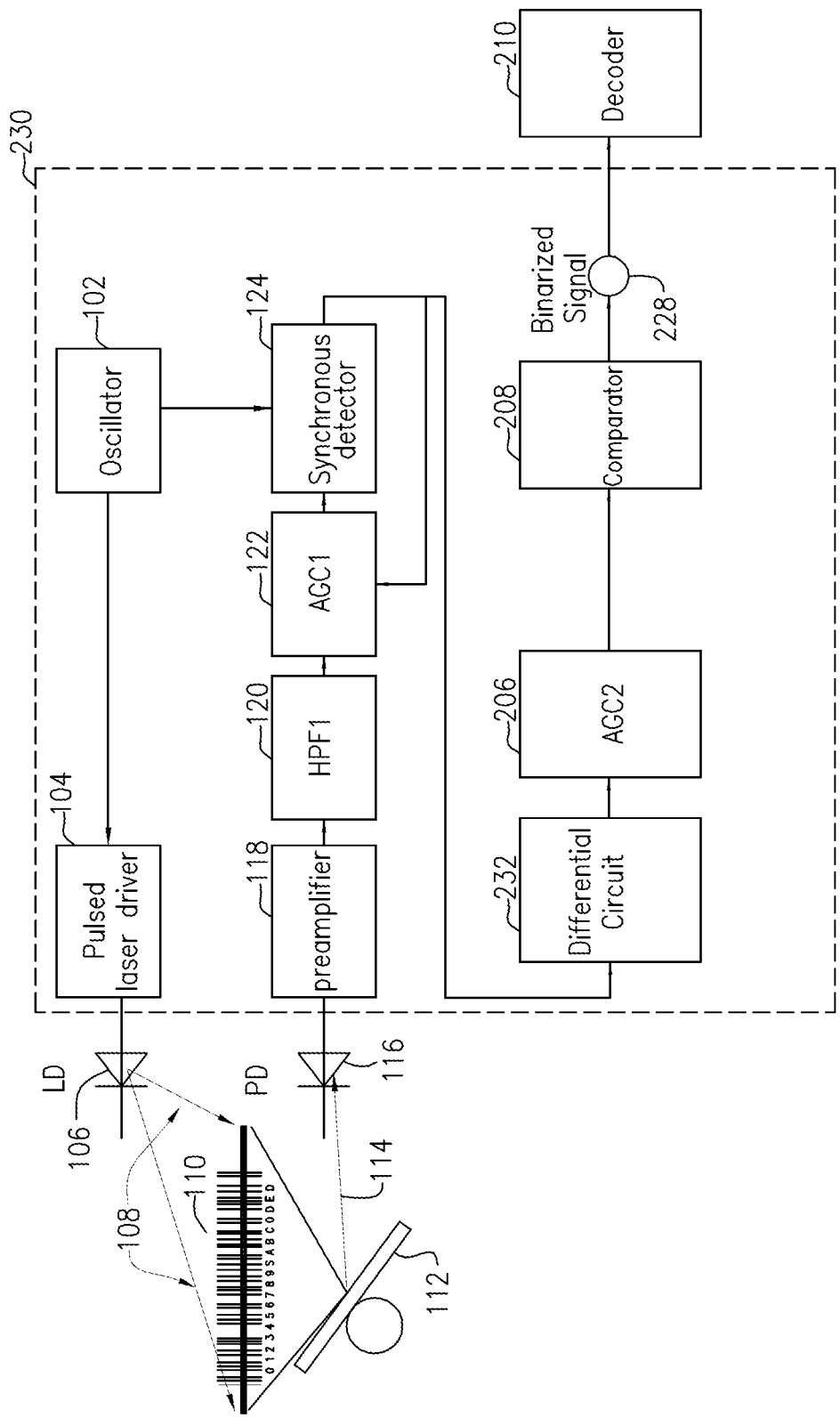
FIG. 3 is block diagram of a bar code reader incorporating frequency filtering and gain control in accordance with yet another embodiment of the present invention.

FIG. 3 is block diagram of a bar code reader 10 incorporating frequency filtering and gain control in accordance with an embodiment of the present invention. In the embodiment of FIG. 3, the function of removing low-frequency light energy from the signal emerging from detector 124 may be provided by a differential circuit 232, as disclosed in commonly assigned patents (a) U.S. Pat. No. 7,354,000 and (b) U.S. Pat. No. 7,526,130, instead of a conventional high-pass filter.

In the circuits disclosed in above-listed patents, the differential circuit is located right after the pre-amplifier and is configured to remove signal components, arising from ambient light energy, from the electrical signal. However, in this case, the differential circuit 232 is preferably situated to receive the output from detector 124. Synchronous detector 124 is preferably operable to remove high-frequency ambient light energy such as, for instance, the high-frequency energy introduced by high-frequency driven L.E.D. light bulbs in the ambient environment external to bar code reader 10. However, differential circuit 232 is preferably operable to filter out low-frequency components of the signal emerging from detector 124, including but not limited to, light energy arising from the scattering of light off window 126 and/or other surfaces within a housing of bar code reader 10.

Once the signal emerges from differential circuit 232, circuit devices 206, 208, and 210 preferably operate in much the way described earlier in connection with the embodiment of FIG. 1. Accordingly, the discussion of the operation of circuit devices 206, 208, and 210 is not addressed further in this section.

Still with reference to FIG. 3, we note that the devices encompassed by the dashed line called out by reference numeral 230 may be implemented on one or more analog ASIC circuits.

Figure 4:
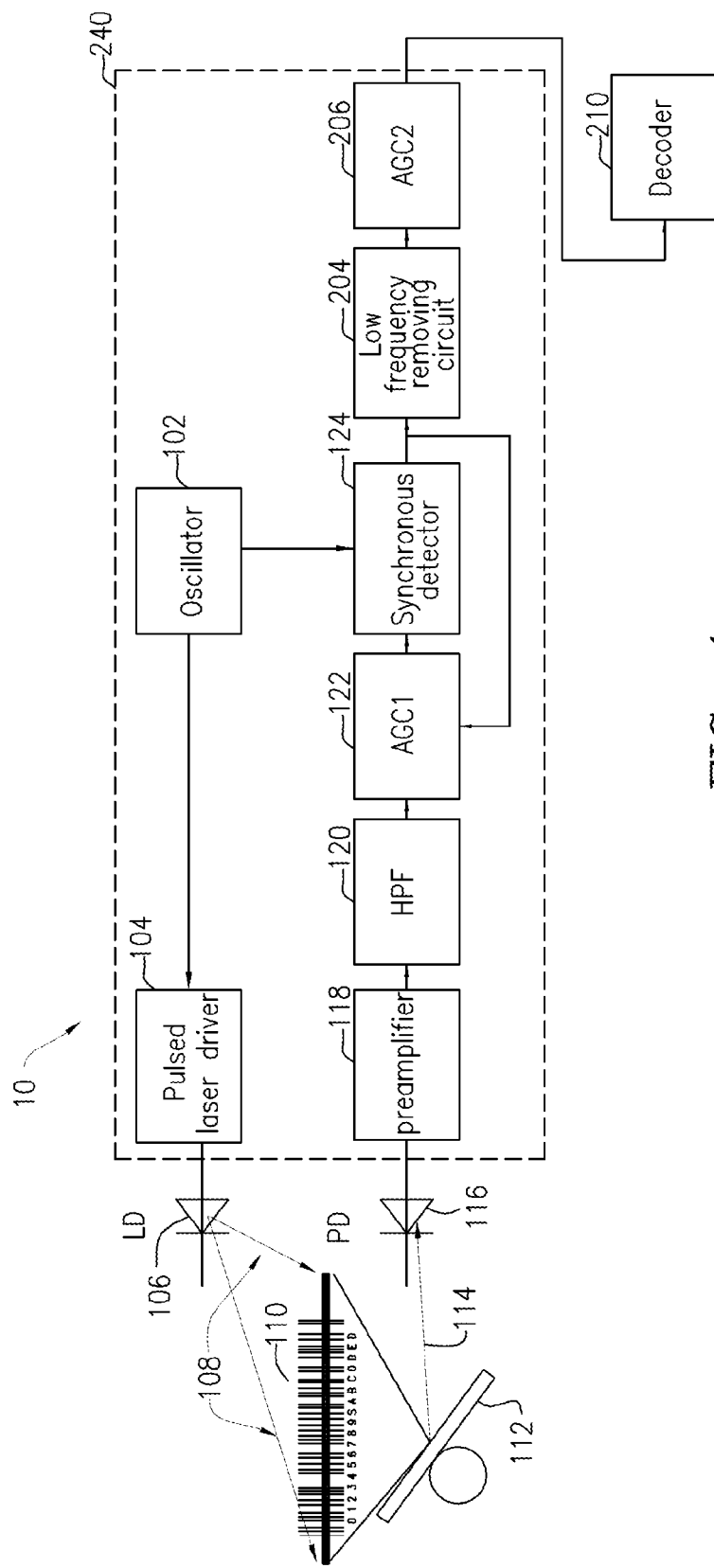
FIG. 4 is block diagram of a bar code reader incorporating frequency filtering and gain control in accordance with yet another embodiment of the present invention.

FIG. 4 is block diagram of a bar code reader 10 incorporating frequency filtering and gain control in accordance with an embodiment of the present invention. We note that the circuitry encompassed by dashed line 240 may be implemented on one or more analog ASIC circuits. In the embodiment of FIG. 4, the digitizing function may be performed in decoder 210 if suitable microprocessors are selected for the construction and implementation of decoder 210. The AGC2 206 circuit may output an analog signal to decoder 210. After the analog-to-digital conversion, the thresholding process could be performed in software in decoder 210, rather than comparing analog voltage levels within analog ASIC 240.

Figure 5:
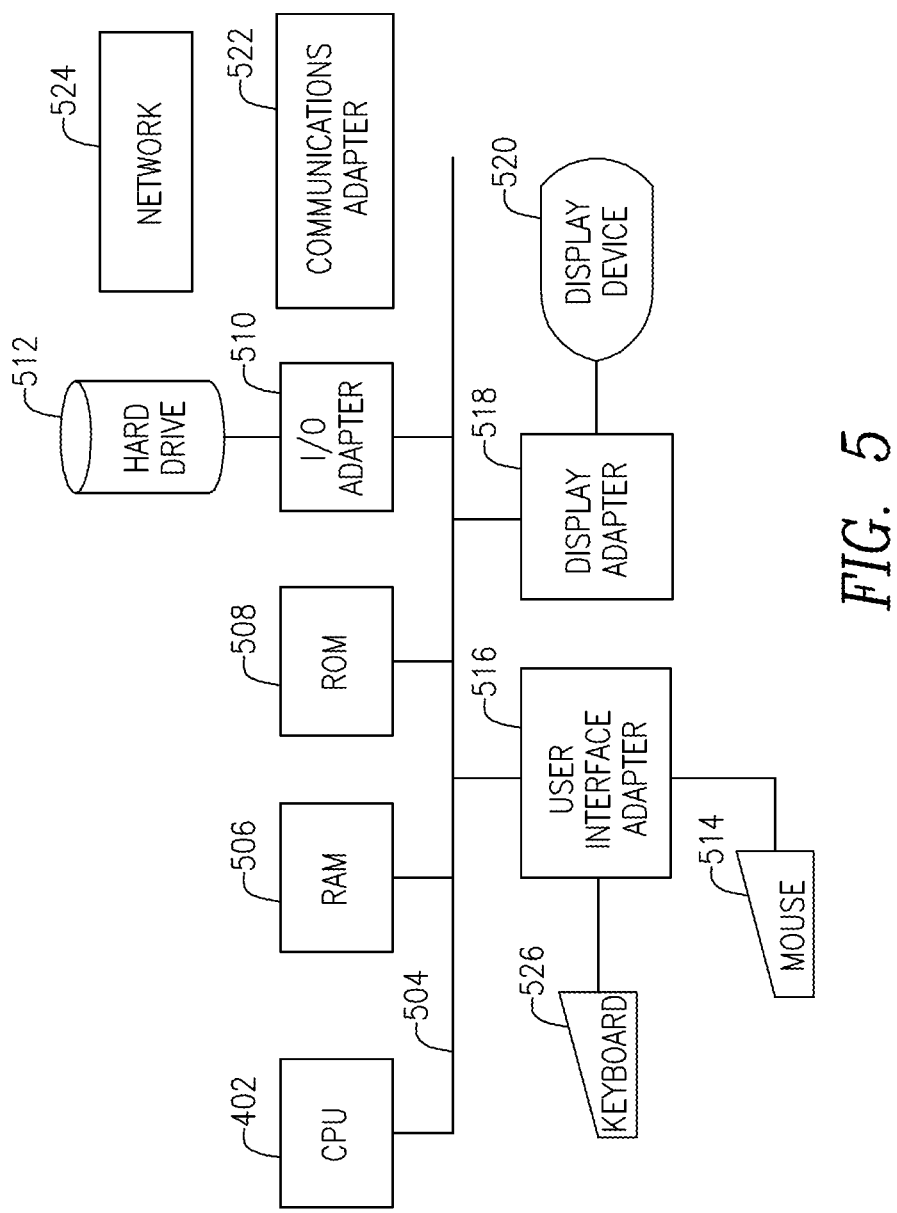
FIG. 5 is a block diagram of a computing system useable with one or more embodiments of the present invention.

FIG. 5 is a block diagram of a computing system 500 adaptable for use with one or more embodiments of the present invention. Central processing unit (CPU) 402 may be coupled to bus 504. In addition, bus 504 may be coupled to random access memory (RAM) 506, read only memory (ROM) 508, input/output (I/O) adapter 510, communications adapter 522, user interface adapter 516, and display adapter 518.

In an embodiment, RAM 506 and/or ROM 508 may hold user data, system data, and/or programs. I/O adapter 510 may connect storage devices, such as hard drive 512, a CD-ROM (not shown), or other mass storage device to computing system 500. Communications adapter 522 may couple computing system 500 to a local, wide-area, or global network 524. User interface adapter 516 may couple user input devices, such as keyboard 526, scanner and/or pointing device 514, to computing system 500. Moreover, display adapter 518 may be driven by CPU 502 to control the display on display device 520. CPU 502 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A bar code reader comprising:
    a laser light output circuit operable to provide a pulsed laser light output toward a bar code, the pulsed laser light output having a specified frequency;
    a photodiode to convert light received at the bar code reader into an electrical signal;
    a first signal conditioning circuit to filter and amplify the electrical signal, to thereby provide a conditioned electrical signal;
    a detection circuit operable to sample the conditioned electrical signal at the specified frequency to produce a sampled electrical signal;
    a second signal conditioning circuit comprising a first high-pass filter and a first automatic gain control, wherein:
        (i) the first high-pass filter is operable to filter out light energy from the sampled electrical signal due to light scattering within a housing of the bar code reader to produce a filtered, sampled electrical signal, and
        (ii) the first automatic gain control Is operable to amplify the filtered, sampled electrical signal at an output of the first high-pass filter to produce an amplified, filtered, sampled electrical signal;
    a digitizer comprising a comparator and a first low-pass filter, wherein:
        (i) an output of the first automatic gain control is directly electrically connected to an input of the comparator and the first low-pass filter so as to directly provide the amplified, filtered, sampled electrical signal to both the comparator and the first low-pass filter, and
        (ii) the comparator is operable to compare a voltage of the amplified, filtered, sampled electrical signal to a threshold voltage provided by the first low-pass filter in order to generate, based on the comparison, one of:

(a) a voltage value corresponding to a logical "1" value, and
(b) a voltage value corresponding to a logical "0" value; and
a decoder for resolving output from the digitizer into data indicative of information on the bar code.

2. The bar code reader of claim 1 wherein the first signal conditioning circuit comprises:
a preamplifier for amplifying the electrical signal output from the photodiode;
a second high-pass filter for filtering the signal emerging from the preamplifier; and
a second automatic gain control circuit for amplifying the signal from the second high-pass filter.

3. The bar code reader of claim 1 wherein the laser light output circuit comprises an oscillator that causes the laser light output to be pulsed at the specified frequency.

4. The bar code reader of claim 3 wherein the detection circuit comprises:
a detector synchronized with the oscillator thereby causing the detector to sample the signal from first signal conditioning circuit at the specified frequency of the oscillator.

5. The bar code reader of claim 1 wherein the digitizer comprises:
an analog-to-digital converter for converting the output from the second signal conditioning circuit into a digital output.

6. The bar code reader of claim 5 wherein the digitizer further comprises:
a thresholding circuit for generating either the logical "1" or the logical "0" value from the digital output of the analog-to-digital converter.

7. The bar code reader of claim 1 wherein the first low-pass filter is located in between the second signal conditioning circuit and the comparator, and wherein the first low-pass filter is operable to remove high-frequency noise components in the amplified, filtered, sampled electrical signal received from the first automatic gain control of the second signal conditioning circuit.

8. The bar code reader of claim 1 wherein the digitizer is implemented in software executing on a digital circuit.

9. The bar code reader of claim 1 wherein the digitizer and the decoder are implemented in software on at least one single digital circuit.

10. A method for reading a bar code, comprising:
transmitting light pulsed at a selected frequency to illuminate said bar code;
converting light received at the bar code reader from the bar code into an electrical signal;
transmitting the electrical signal through a signal conditioning circuit to filter and amplify the electrical signal, to thereby provide a conditioned electrical signal;
sampling the conditioned electrical signal at the selected frequency to produce a sampled electrical signal;
removing energy due to light scattering within a housing of the bar code reader from the sampled electrical signal, wherein removing the energy comprises:
(i) transmitting the sampled electrical signal through a high-pass filter to produce a filtered, sampled electrical signal, and
(ii) transmitting the filtered, sampled electrical signal to an automatic gain control that Is operable to amplify the filtered, sampled electrical signal at an output of the high-pass filter to produce an amplified, filtered, sampled electrical signal;

directly outputting, by the automatic gain control, the amplified, filtered, sampled electrical signal to an input of a comparator and a low-pass filter;
comparing, by the comparator, a voltage of the amplified, filtered, sampled electrical signal to a threshold voltage provided by the first low-pass filter in order to generate, based on the comparison, one of:
(a) a voltage value corresponding to a logical "1" value, and
(b) a voltage value corresponding to a logical "0" value; and
resolving output from the step of generating into data indicative of information on the bar code.

11. A bar code reader comprising:
a laser light output circuit operable to provide a pulsed laser light output toward a bar code, the pulsed laser light output having a specified frequency;
a photodiode to convert light received at the bar code reader into an electrical signal;
a first signal conditioning circuit to amplify the electrical signal, to thereby provide a conditioned electrical signal;
a detection circuit operable to sample the conditioned electrical signal at the specified frequency to produce a sampled electrical signal;
a second signal conditioning circuit comprising a first high-pass filter and a first automatic gain control circuit, wherein the first high-pass filter is operable to filter out light energy from the sampled electrical signal due to scattering to produce a filtered, sampled electrical signal, and wherein the first automatic gain control Is operable to amplify the filtered, sampled electrical signal at an output of the first high-pass filter to produce an amplified, filtered, sampled electrical signal;
a digitizer comprising a comparator, wherein an output of the first automatic gain control is directly electrically connected to an input of the comparator for generating digital output based on a value of the amplified, filtered, sampled electrical signal of said second signal conditioning circuit; and
a decoder for resolving output from the digitizer into data indicative of information on the bar code.

12. The bar code reader of claim 11 wherein the first signal conditioning circuit comprises:
a preamplifier for amplifying the electrical signal output from the photodiode;
a second high-pass filter for filtering the signal emerging from the preamplifier; and
a second automatic gain control circuit for amplifying the signal from the second high-pass filter.

13. The bar code reader of claim 11 wherein the laser light output circuit comprises an oscillator that causes the laser light output to be pulsed at the specified frequency.

14. The bar code reader of claim 13 wherein the detection circuit comprises:
a detector synchronized with the oscillator thereby causing the detector to sample the signal from first signal conditioning circuit at the specified frequency of the oscillator.

15. The bar code reader of claim 11 wherein the detection circuit comprises:
a band-pass filter at said specified frequency causing the detection circuit to sample the signal from first signal conditioning circuit at the specified frequency; and
a waveform detector.

16. The bar code reader of claim 11 wherein the detection circuit comprises:
   a product detector operable to cause the detection circuit to sample the signal from first signal conditioning circuit at the specified frequency.

17. The bar code reader of claim 11 wherein the digitizer comprises:
   an analog-to-digital converter for converting the output from the second signal conditioning circuit into a digital output.

18. The bar code reader of claim 17 wherein the digitizer further comprises:
   a thresholding circuit for generating one of a logical "1" value and a logical "0" value from the digital output of the analog-to-digital converter.

19. The bar code reader of claim 11 wherein the comparator is operable to compare a voltage of the amplified, filtered, sampled electrical signal to a threshold voltage provided by a low-oass filter and to output one of (a) a voltage value corresponding to a logical "1" value; and (b) a voltage value corresponding to a logical "0" value, based on the result of the comparison.

20. The bar code reader of claim 19 wherein the low-pass filter is located in between the second signal conditioning circuit and the comparator to isolate a DC voltage component of the amplified, filtered, sampled electrical signal to provide the threshold voltage for use in the comparator.

21. The bar code reader of claim 11 wherein the digitizer is implemented in software executing on a digital circuit.

22. The bar code reader of claim 11 wherein the digitizer and the decoder are implemented in software on at least one single digital circuit.

23. A method for reading a bar code, comprising:
   transmitting light pulsed at a selected frequency to illuminate said bar code;
   converting light received at the bar code reader from the bar code into an electrical signal;
   transmitting the electrical signal through a signal conditioning circuit to amplify the electrical signal, to thereby provide a conditioned electrical signal;
   sampling the conditioned electrical signal at the selected frequency to produce a sampled electrical signal;
   removing light energy from the sampled electrical signal that arises from laser scattering within a housing of the bar code reader, wherein the step of removing comprises:
      (i) transmitting the sampled electrical signal through a high-pass filter to produce a filtered, sampled electrical signal, and
      (ii) transmitting the filtered, sampled electrical signal to an automatic gain control that Is operable to amplify the filtered, sampled electrical signal at an output of the high-pass filter to produce an amplified, filtered, sampled electrical signal;
   generating a digital output based on a value of the signal generated by the step of removing, wherein the step of generating is performed by a digitizer that comprises a comparator and a low-pass filter having an input that is directly electrically connected to an output of the automatic gain control for receiving the amplified, filtered, sampled electrical signal; and
   resolving output from the step of generating into data indicative of information on the bar code.

* * * * *